Patented Dec. 10, 1940

2,224,791

UNITED STATES PATENT OFFICE 2,224,791

PROCESS FOR THE MANUFACTURE OF SELENIUM-CONTAINING RUBY GLASS

Hans Löffler, Berlin-Dahlem, Germany, assignor to Deutche Gold und Silber Scheideanstalt, vormals Roessler, Frankfort-on-the-Main, Germany, a corporation of Germany No Drawing. Application June 7, 1937, Serial No. 146,858. In Germany December 14, 1936

1 Claim. (Cl. 106—36.1)

This invention is concerned with a method for controlling the formation of color in ruby red glasses which contain selenium.

It is now known that ruby glass can be prepared by the simultaneous use of selenium and an agent which, in conjunction with selenium, imparts a red color to glass such as a cadmium-containing compound. The two elements may be introduced in the form of cadmium selenide, or ingredients may be introduced separately which will yield cadmium selenide in the melt under the conditions of melting. In the preparation of such ruby glasses it has usually been considered necessary to have sulfur present in the form of zinc sulfide. Glasses of the type described must be heated a second time in order that the ruby color may be developed therein. A second heating is especially necessary when it is desired to reduce the amount of the coloring agent to a minimal quantity.

When reheating the glass in order to develop the red color it is necessary that the heat shall be applied carefully and uniformly as the coloring process is dependent upon the composition of the glass batch, on the wall thickness of the finished object prepared from the glass batch, and on the amount of coloring agent utilized. In spite of maintenance of uniform conditions during heating the art has generally experienced frequent fluctuation in the shade of the resulting colored glass or glass object. These fluctuations in shade are very objectionable.

It has now been found that the process of imparting color to cadmium and selenium-containing ruby glass may be accelerated and controlled by adding the requisite sulfur in the form of various sulfides. As a result of lengthy and complete research it has been ascertained that alkali sulfides, alkali thiocyanates and zinc thiocyanate accelerate the process whereby color is developed in the glass. Thus they resemble cadmium sulfide in their action.

An alkali thiocyanate, more especially potassium or sodium thiocyanate, can be used most advantageously for this purpose. The sulfides of zinc, arsenic, and iron slow up the development of color and are sharply contrasted with the sulfides and thiocyanates of the alkali metals and of zinc thiocyanate which do not interfere with the development of color but actually accelerate that development. The sulfides of the alkaline earth metals and of tin and of antimony, while not impeding the development of color, do not tend to accelerate it to as great an extent as the salts of the alkali metals and zinc. They are useful in the process forming the subject matter of this application, however, along with the sulfides and thiocyanates of those metals specified as most suitable for accelerating color development.

Accordingly, it has been found possible to control development of color in ruby glasses, either to accelerate it or retard it, by the proper selection and addition of sulfur-containing compounds to the basic glass batch. It is possible to accelerate the development of color when using small amounts of the coloring agent by the addition of sulfur in the form of compounds of those metals known to accelerate color development, i. e., alkali metal sulfides or thiocyanates or zinc thiocyanate. This is a distinct improvement in the process of coloring glass red for ordinarily with small amounts of the coloring agent prolonged heating has been necessary. By utilizing a compound which accelerates the formation of color development it has been found that the period of heating need not be any longer than that usual when employing relatively larger amounts of the coloring agent.

In place of, or in addition to, sulfides or thiocyanates of the metals specified, which in accordance with my invention are utilized for controlling, i. e. either slowing up or accelerating the development of color in ruby red glass, it is also possible to utilize various sulfur-containing compounds of the metals specified which, under the conditions prevailing in the glass batch, are converted into sulfides or thiocyanates or which are capable of forming sulfides of the metals named with the reducing agents present in, or added to, the glass batch. For example, organic sulfur compounds may be regarded as agents of the first type, i. e., are converted to sulfides or thiocyanates in the glass batch. As examples of compounds which react with reducing agents present in the glass batch to form sulfides of the specified metals may be mentioned sulfates or sulfites to which carbon or a finely divided organic substance is added or which may be converted to the corresponding sulfides by the introduction into the glass melt of various reducing gases such as carbon monoxide.

As examples of the improved process for controlling the development of color in ruby red glasses wherein the color is developed by a second heating, the following may be given:

Example 1

To a glass batch having the following composition: 71% $SiO_2$, 10% $Na_2O$, 6% $K_2O$, 6% $ZnO$, 5% CaO, and 2% Na$_2$B$_4$O$_7$, is added cadmium selenide in the amount of 1.25 kg. per 400 kg. of SiO$_2$ and zinc sulfide in the amount of 0.125 kg. per 100 kg. of SiO$_2$. The glass is melted and then worked into thin walled hollow glassware in which the desired ruby red color is developed only upon vigorous heating.

Example 2

In the glass batch specified in Example 1 the zinc sulfide is replaced by an equivalent amount of potassium thiocyanate. The result is a glass which develops the characteristic and desired ruby coloration simply upon slight heating. If glassware with heavier walls is prepared from this glass batch no special heating is necessary to develop the deep ruby color as this color will be apparent in the heavier glass walls immediately.

It has also been found that the coloring process can be accelerated by the addition of halides as, for example, sodium chloride, to the glass melt. The amount of metallic halides added is advantageously proportioned so that since a high vapor pressure exists at the temperature at which the glass batch is melted losses of cadmium due to carrying over by the volatilized metallic halides do not occur. As a result, the danger of the ruby color being destroyed by volatilization of cadmium during the melting process is greatly lessened.

It has also been found that metallic fluorides such as cryolite can also be advantageously added to the glass batch. When utilizing fluorides, however, it has been noticed that they dissolve in the glass only to a limited degree and when greater amounts of fluorides are present they are no longer soluble in the glass. As a result the glass is turbid. As a general rule, from 2 to 5 kg. of cryolite per 100 kg. of sand may be present in the glass batch without deleterious turbidity.

For example, if 3 kg. of cryolite per 400 kg. of sand is added to the glass batch given in Example 1, the desired ruby red color is obtained directly in the glass batch without the necessity for subsequent heating.

It will be apparent that various changes may be made in the proportions, conditions and amounts given as illustrative in the examples without departing from the spirit or scope of the invention. The various details of my process given as illustrative are not to be regarded as limiting the scope of the invention except as necessitated by the appended claim. It will be obvious to those skilled in the art that my invention is susceptible to various other changes and modifications which would clearly be within the purview of the invention and which would not in any sense depart from the spirit thereof. It is my desire, therefore, that only such limitations shall be placed upon the invention as imposed by the prior art or as are specifically set forth in the claim.

I claim:

In a process for manufacturing selenium-containing ruby glasses which contain cadmium in addition to selenium wherein the ruby color is developed by a reheating subsequent to the melting and cooling of the glass batch, the improvement which comprises incorporating in the batch from which said glasses are prepared an agent selected from the group consisting of alkali metal sulfides, alkali metal thiocyanates and zinc thiocyanate, whereby the formation of color in the reheating step is accelerated.

HANS LÖFFLER.